US006329009B1

(12) United States Patent
Inakuma et al.

(10) Patent No.: US 6,329,009 B1
(45) Date of Patent: Dec. 11, 2001

(54) METHOD FOR CONTINUOUS ROASTING OF FOOD MATERIALS

(75) Inventors: Takahiro Inakuma; Hiroyasu Furui, both of Tochigi; Yoshinori Tokugawa, Hiroshima; Fumiaki Tsuda, Hiroshima; Mitsuo Nagai, Hiroshima, all of (JP)

(73) Assignee: Kagome Co., Ltd., Aichi (JP)

( * ) Notice: Subject to any disclaimer, the term of this patent is extended or adjusted under 35 U.S.C. 154(b) by 0 days.

(21) Appl. No.: 09/231,792

(22) Filed: Jan. 15, 1999

Related U.S. Application Data

(62) Division of application No. 09/012,597, filed on Jan. 23, 1998.

(30) Foreign Application Priority Data

Jan. 30, 1997 (JP) .................................................... 9-016831

(51) Int. Cl.$^7$ .................................. A23L 1/01; A23P 1/00
(52) U.S. Cl. .......................................... 426/519; 426/523
(58) Field of Search ..................................... 426/519, 523, 426/438

(56) References Cited

U.S. PATENT DOCUMENTS

| 1,355,137 | 10/1920 | Frick . |
| 1,677,912 | * 7/1928 | Bartleson . |
| 2,105,782 | * 1/1938 | Fauth ........................................ 37/13 |
| 3,731,339 | 5/1973 | Addison .............................. 15/246.5 |
| 3,973,623 | * 8/1976 | Sarll ....................................... 165/94 |
| 4,055,673 | * 10/1977 | Mueller et al. ...................... 426/231 |
| 4,575,253 | 3/1986 | List et al. .............................. 366/331 |
| 4,601,583 | 7/1986 | Amorese .............................. 366/343 |
| 5,013,368 | 5/1991 | Maroy et al. ...................... 134/22.11 |
| 5,030,465 | * 7/1991 | Curry et al. ......................... 426/474 |
| 5,208,062 | * 5/1993 | Sugisawa et al. .................... 426/589 |
| 5,609,902 | 3/1997 | Inakuma et al. ..................... 426/466 |

FOREIGN PATENT DOCUMENTS

| 393 893 A | 11/1965 | (CH) . |
| 27 18 189 A | 1/1979 | (DE) . |
| 0 193 633 A1 | 9/1986 | (FR) . |
| 0 702 922 A1 | 3/1996 | (FR) . |
| 0 715 826 A1 | 6/1996 | (FR) . |
| 0 779 052 A1 | 6/1997 | (FR) . |
| 7132055 | 5/1995 | (JP) . |

OTHER PUBLICATIONS

Perry, R. H. et al., "Perry's Chemical Engineers' Handbook," McGraw–Hill, New York. 1/84.

* cited by examiner

Primary Examiner—Keith Hendricks
Assistant Examiner—Drew Becker
(74) Attorney, Agent, or Firm—Sughrue, Mion, Zinn, Macpeak & Seas, PLLC

(57) ABSTRACT

In the method and apparatus for continuous roasting of food materials according to the present invention, a food material is mixed up by blades (9f) provided on a paddle plate (9d) via an elastic material (9f1) in a tubular cylinder (1) with open ends. Thus the blades (9f1) come in contact, at least once, with all faces of the inner wall of the tubular cylinder (1) while the screw shaft makes one rotation. As a result, roasting can be completed in a favorable manner.

11 Claims, 3 Drawing Sheets

METHOD FOR CONTINUOUS ROASTING OF FOOD MATERIALS

This is a divisional of application Ser. No. 09/012,597 filed Jan. 23, 1998, the disclosure of which is incorporated herein by reference.

BACKGROUND OF THE INVENTION

1. Field of the Invention

This invention relates a method for continuous roasting of food materials and an apparatus therefor. More particularly, it relates to a novel improvement for the continuous frying, drying and concentration of food materials.

2. Related Art

A common method for pan-frying food materials comprises feeding a small amount of oil in a heatged pan or frying pan and then heating the food materials together with the oil. When pan-frying, which is one of the easiest cooking operations, is employed at home, a small amount of food materials can be readily fried in a frying pan without requiring much labor or attention. On the other hand, the currently employed methods for cooking a large amount of food materials can be roughly classified into the following three types depending on the shape of the pan and the cooking process.

Namely, "Atarashii Shokuhin Kako Gijutsu to Sochi (New Techniques and Apparatuses for Processing Foods)" published by Sangyo Chosa-kai (Jan. 10, 1991) discloses an "escargot" type fryer, a "cup" type fryer and a fryer provided with an agitator. In the first method of the "escargot" type fryer, a pan with a "snail"-shaped bottom is slowly rotated horizontally so that food materials are slowly moved toward the outer peripheral of the pan under heating and then once collected therein. Subsequently, the pan is further rotated and inclined at a definite angle. Then the food materials drop into the outer periphery of the pan owing to the gravity of the food materials per se. In this step, the direction of dropping can be altered with the use of small paddles and thus the food materials can be agitated. Also, the food materials drop a specific distance while giving off the excessive vapor therefrom. In this method, the above procedures are carried out repeatedly. In the second method, the "cup" type pan is equipped on the inner periphery with one or two plates or projections for carrying up the food materials. Since the cup type fryer has no lid in usual, it is somewhat inclined upward in rotational frying. The food materials are slightly carried up from the bottom of the pan by the plate(s) or projection(s) on the inner periphery and turned upside down, thus being agitated. In the method of the fryer provided with an agitator, a pan is not rotated but the food materials are fried with a paddle- or ribbon-type agitator under a planetary motion. Pans of this type are disclosed in, for example, JP-B-57-38255 (the term "JP-B" as used herein means an "examined Japanese patent publication") and JP-A-U-62-136193 (the term "JP-A-U" as used herein means an "unexamined published Japanese utility model application"). In the field of food processing, it has been a practice to roast food materials by using the fluidized gas bed system or the fluidized rotary bed system in the intermediate or final stage of the processing. In the fluidized gas bed system, powdery materials are suspended and fluidized by hot air supplied onto a rectifier such as a porous plate and dried by vigorously mixing with the hot air. In the rotary fluidized bed system, a fluidized bed is divided into small portions by rotating a compartmented rotor and food materials are fluidized exclusively in each compartment.

The conventional methods for continuous roasting with the constructions as described above suffer from the following problems.

That is to say, in each of the "escargot" type fryer, the "cup" type fryer and the fryer provided with an agitator, food materials should be replaced each time, which makes the continuous roasting difficult. In these cases, moreover, the qualities of the fried products varies from batch to batch.

In these fryers, furthermore, a large amount of food materials are agitated while being in contact with each other and, therefore, soft materials or softened ones would lose their shapes. In the case of the fluidized gas bed system, continuous roasting can be hardly performed. In addition, it is difficult to suspend and fluidized some food materials in hot air due to the form, size, etc. thereof. On the other hand, food materials in any form can be processed by the rotary fluidized bed system. However, it is needed in this case to employ a complicated and, in its turn, expensive apparatus.

SUMMARY OF THE INVENTION

Thus, the present invention aims at providing a less expensive method and apparatus for continuous roasting of food materials whereby the food materials can be continuously roasted regardless of the form thereof and the transfer speed in the cylinder can be continuously and partly changed without losing the shapes of the food materials, thus attaining the optimum roasting and transferring speeds suitable for the conditions of processing the food materials.

The method for continuous roasting of food materials according to the present invention comprises mixing up and transferring a food material in a powdery, particulate, chipped or shredded form in a horizontally placed, tubular cylinder with open ends under heating with the use of a paddle screw provided with a plurality of blades. More particularly, it comprises continuously supplying a food material in a powdery, particulate, chipped or shredded form from an inlet at one end of a horizontally placed, tubular cylinder; then mixing up and transferring said food material in said tubular cylinder with open ends under heating with the use of said paddle screw; and continuously discharging it from an outlet at another end of said tubular cylinder. Furthermore, it comprises supplying the food material quantitatively from the inlet of said tubular cylinder and mixing up and transferring the food material therein in such a state as filling not more than a half of the cross-sectional area of the bore through said tubular cylinder. Furthermore, it comprises mixing up and transferring the food material with a paddle screw provided with angle-adjustable blades.

The apparatus for continuous roasting of food materials according to the present invention comprises: a horizontally placed, tubular cylinder having an open inlet in the rear end side, an open outlet in the front end side, and a bore of a circular cross section formed therethrough; a jacket provided around the outer periphery of said tubular cylinder; a paddle screw rotatably inserted into the bore of said tubular cylinder and consisting of a screw shaft provided with blade(s) via an elastic material; and a rotational drive unit for driving said paddle screw; wherein said blade(s) of said paddle screw are adapted to rotate while being in contact with the inner wall of said tubular cylinder. More particularly, the apparatus is constructed so that a plurality of blades are provided and the inner wall of said tubular cylinder is constructed so that all of the faces thereof are in contact with these blades.

That is to say, in the method and apparatus for continuous roasting of food materials according to the present invention, a food material in a powdery, particulate, chipped or shredded form is supplied from the inlet into the tubular cylinder, heated by the tubular cylinder at a high temperature and successively transferred into the outlet while mixing up with a plurality of angle-adjustable blades adapted to the screw shaft of the rotating paddle screw.

The blades rotate while being in contact with the inner wall of the tubular cylinder. The food material pooled in the lower part of the bore is mixed up by the blades and roasted. The transfer distance can be changed by adjusting the holding angles of the blades. It is possible to adjust the respective holding angles of the blades.

The food material is continuously and quantitatively supplied from the inlet by a supplying unit at a rate appropriate for attaining the desired roasting time or the roasting rate in such a manner as to fill not more than a half of the cross-sectional area of the bore through said tubular cylinder.

Because of filling not more than a half of the cross-sectional area of the bore through said tubular cylinder, a small amount of the food material can be sufficiently mixed up and heated in each bore.

Since the tubular cylinder has the open inlet and outlet, the evaporated components such as vapor formed in the process of frying the food material are discharged therefrom. When a vent port is provided in the middle part of the tubular cylinder, these evaporated components are effectively discharged via this vent port too. If needed, edible oils, water or seasonings may be added via this vent port.

To the food material supplied into the tubular cylinder are added effective amounts of edible oils, water or seasonings at the appropriate point in the course of supplying or frying.

After being supplied into the tubular cylinder, the food material is heated in the optimum state by the heating unit whereby the heating temperature and the transfer speed can be changed along the transfer direction in accordance with the roasting condition.

The blades of the paddle screw are adapted to the screw shaft via the elastic material in such a manner as being in contact with the inner wall of the tubular cylinder. Accordingly, the inner wall comes in contact with the blades at any part. Further, there arises no problem of the unnecessary torque up in the rotational drive unit due to the excessively high extent of contact and the abrasion of the inner wall, blades, etc. is relieved.

DETAILED DESCRIPTION OF THE PREFERRED EMBODIMENTS

Figure 1:
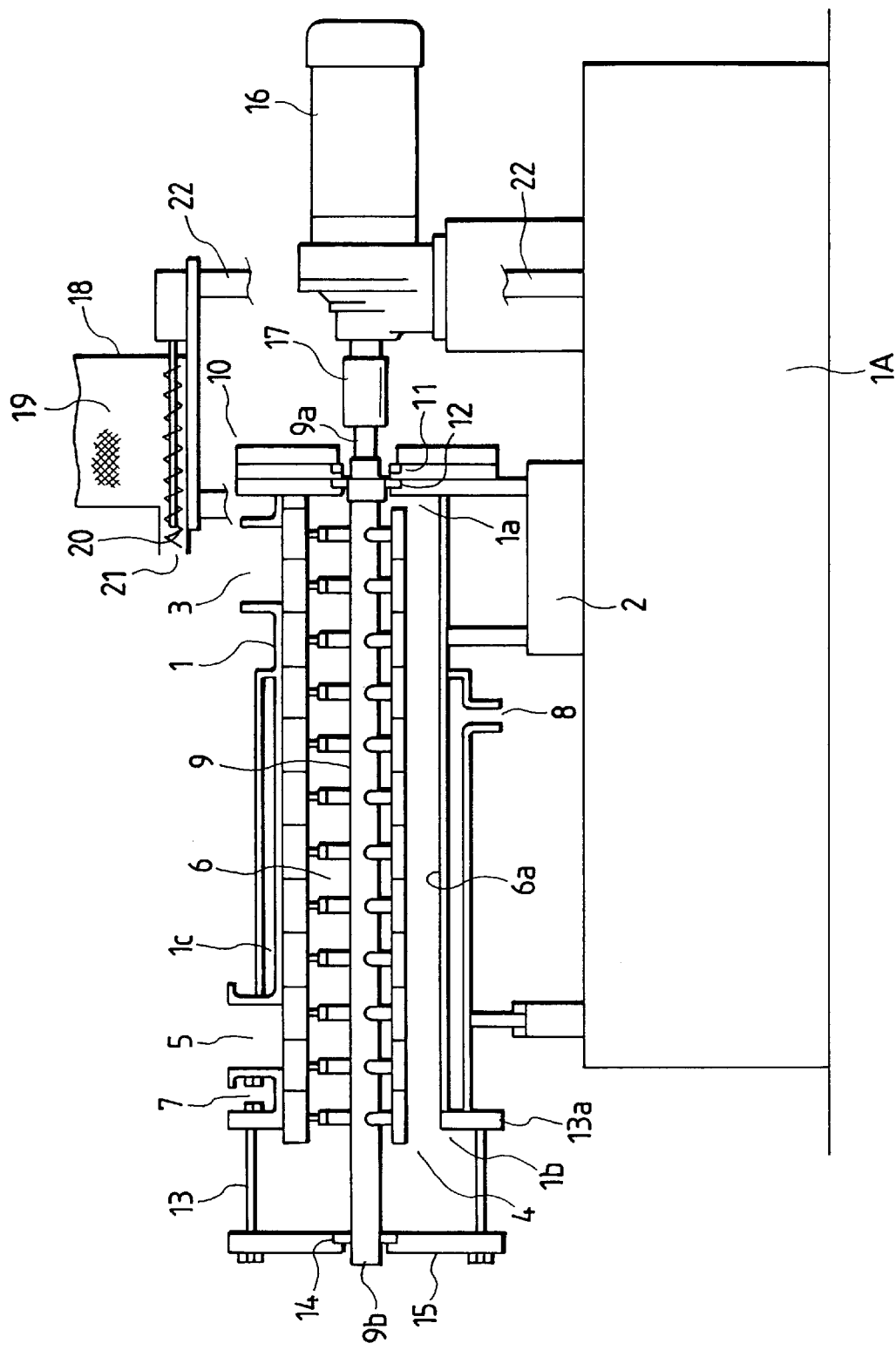
FIG. 1 is a view showing the whole construction of the apparatus for continuous roasting of food materials of the present invention.
Figure 2:
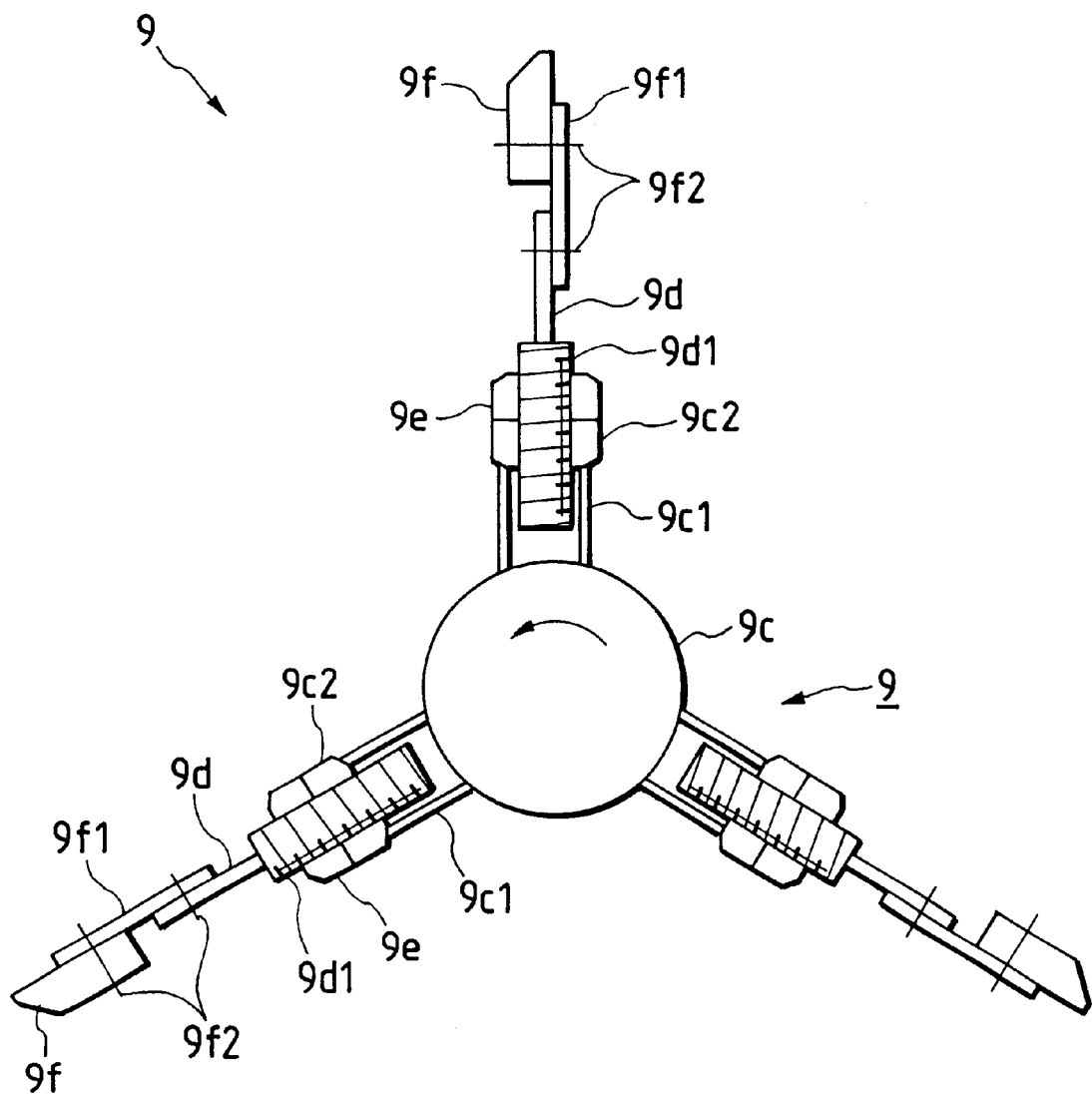
FIG. 2 is the front view of the paddle screw of FIG. 1.
Figure 3:
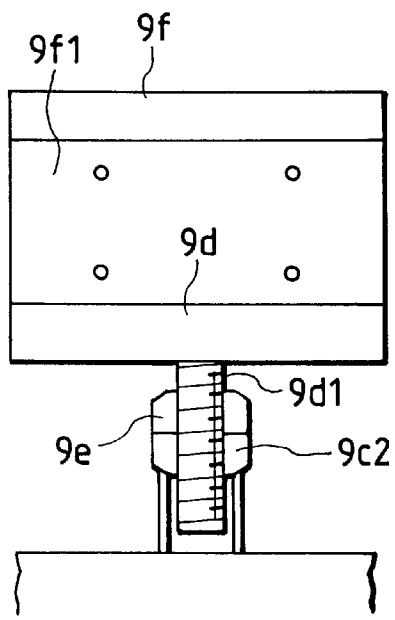
FIG. 3 is an enlarged side view of the major part of the paddle screw of FIG. 2.
Figure 4:
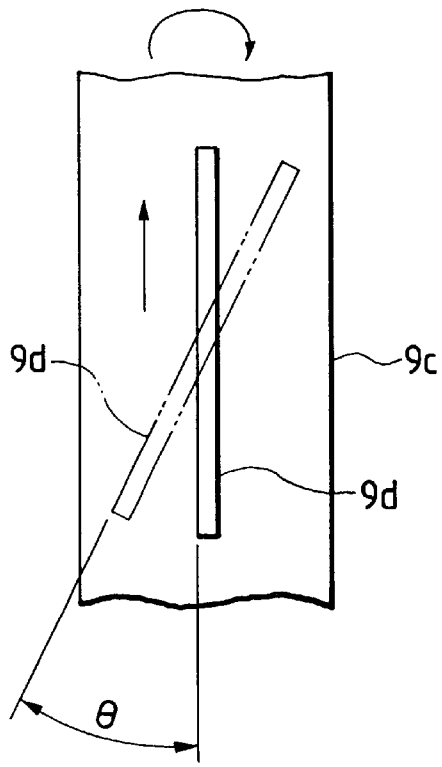
FIG. 4 is an enlarged plan view of the major part of the paddle screw of FIG. 2.

Now, preferred embodiments of the method and apparatus for the continuous roasting of food materials according to the present invention will be described in detail with reference to the accompanying drawings. FIGS. 1 to 4 show the apparatus for continuous roasting according to the present invention. FIG. 1 is a sectional view showing the whole construction of the apparatus; FIGS. 2 and 4 are sectional views each showing the major parts of the apparatus of FIG. 1.

In these drawings, numeral (1) shows an elongated tubular cylinder placed horizontally (including accurately horizontally and almost horizontally) on the foot (2) of a base board (1A) and provided with an inlet (3) opening upward in the rear end side (1a) and an open outlet (4) in the front end side (1b). The inlet (3) has an opening which faces upward at least horizontally.

Between the inlet (3) and the outlet (4) of said tubular cylinder (1), a plurality of vent ports (5) facing upward are formed (in the drawings, only one vent port is shown). The tubular cylinder (1) has a bore (6) having a cross section into which a paddle screw (9) is rotatably inserted. This paddle screw (9) has blades (9f) connected via an elastic material (9f1) to a screw shaft (9c). The rear end (9a) of the screw shaft (9c) is attached to a flange (10), which is provided on the rear end (1a) of said tubular cylinder (1), via a bearing (11) and a packing (12) and connected to a rotational drive unit (16) via a joint (17). Although only one vent port (5) is provided in the embodiment shown in FIG. 1, tow or more vent ports may be formed.

The front end (9b) of said paddle screw (9) is connected to a supporting plate (15) of a support unit (13) provided on the flange (13a) via a bearing (15). As FIG. 2 shows, nuts (9c2) are connected to said screw shaft (9) via a plurality of bars (9c1) located at definite intervals along the longitudinal and peripheral directions. To these bars (9c1) are adapted paddle blades (9d) having thread bars (9d1) respectively with lock nuts (9e) in such a manner that the angle (θ) can be adjusted (see FIG. 4). Further, these paddle plates (9d) are provided with blades (9f) via said elastic material (9f1) with lock bolts (9f2) (see FIGS. 2 and 3). The length of the blades (9f) to the screw shaft (9c) can be determined by rotating the thread bars (9d1) against the nuts (9c2) and (9e). As FIG. 4 shows, the angle (θ) can be freely set by rotating the paddle plate (9d) by θ to the shaft direction and fixing it with the lock nut (9e).

Namely, said blades (9f) are adapted in such a manner that the angle (θ) can be varied within a range of from 0 to 90° and the blades rotate while being in contact with the inner wall (6a) of the tubular cylinder (1). Also, these blades (9f) are attached in such a manner as to contact, at least once, with all faces of the inner wall (6a) of the tubular cylinder (1) while said screw shaft makes one rotation.

A jacket (1c) is provided around the outer periphery of said tubular cylinder (1). Steam is supplied via a steam inlet (7) and discharged from a steam outlet (8), thus heating the tubular cylinder (1). Although only one jacket (1c) is provided in the embodiment shown in FIG. 1, two or more jackets may be formed.

Above said inlet (3), a supply unit (18), whereby a food material (19), i.e., a food stock (powdery food materials such as wheat flour, cereals, beans, various vegetables, meats, tea leaves, fruits, etc.) is supplied from a food outlet (21) to the inlet (3) of said tubular cylinder (1) via an extrusion screw (20) for quantitatively supplying the food material while controlling the supply rate, is connected to said base board (1A) via a bar (22).

Next, illustration will be made on the embodiment of roasting by using the above-mentioned construction in practice.

First, a chipped or shredded food material (19) is loaded on the supply unit (18). This food material (19) is not restricted to a single material. Namely, use may be made therefor of a mixture of a plurality of materials which are to be roasted at the same time.

The supply unit 18 is preliminarily set so that the supply rate of the food material (19) is controlled by the extrusion screw (20) in such a manner that a definite amount of the food material (19) is pooled in the lower part [not more than a half of the cross-sectional area of the bore (6) through the tubular cylinder (1)] over the whole length of the bore (6) depending on the roasting time. During this period, the tubular cylinder (1) is heated with steam to a definite temperature.

The rotational drive unit (16) is driven to thereby rotate the paddle screw (9) in the tubular cylinder (1).

Next, the supply unit (18) is driven and thus the food material (19) is continuously supplied into the inlet (3) of the tubular cylinder (1) at a definite rate.

In the bore (6) of the heated tubular cylinder (1), the food material (19) is heated by the inner wall (6a) and mixed up by the blades (9f) of the rotating paddle screw (9).

The food material (19) thus mixed up drops from the upper half of the bore (6).

Because of filling not more than a half of the cross-sectional area of the bore (6) through said tubular cylinder (1), a small amount of the food material (19) can be sufficiently mixed up and heated in each bore.

The food material (19) is transferred toward the front end (1b) by rotating the paddle screw (9).

In the tubular cylinder (1), the food material (19) comes in contact uniformly with the inner wall (6a) at an appropriate point and thus heated and roasted. At the same time, the food material (19) is transferred from the inlet (3) to the outlet (4) at an appropriate speed depending on the holding angle (θ) of the paddle screw (9) adjusted in the above-mentioned manner. Since the food material (19) is thus heated and roasted, the moisture, etc. contained therein are evaporated and, as a result, the food material is concentrated.

The moisture, etc. evaporated from the food material (19) are spontaneously discharged from the opening inlet (3) and the outlet (4). When vent port(s) (5) are formed on the tubular cylinder (1), the discharge can be performed more easily and the food material (19) can be more effectively dried and concentrated.

To the food material (19), edible oils, water, seasoning, etc. may be added depending on the purpose of the roasting. These additives may be preliminarily mixed with the food material (19). Alternatively, they may be added via the inlet (3) or the vent port (5) of the tubular cylinder (1), or via addition port(s) optionally formed at desired point(s) on the tubular cylinder (1). These additives may be added at any appropriate point in the course of roasting.

The continuous roasting apparatus employed in practice is one having an outer diameter of the paddle screw (9) of 65 mm; holding angles (θ) of the blades (9f) of 5° (in the former half) and 15° (in the latter half); the width and length of the blades (9f) or 15 mm and 65 mm respectively; the number of the blades (9f) attached to the outer periphery of the screw shaft (9c) of 20 in the longitudinal direction in each of 3 points (i.e., 60 in total); and a rate of the outer diameter of the tubular cylinder (1) to that of the paddle screw (9) (65 mm) of about 20. Although square-tipped blades (9f) are shown in FIG. 2, semicircular ones are also usable therefor.

EXAMPLE-1

As the food material (25), square onion pieces (5–10 mm) were supplied from the supply unit (18) into the inlet (3) of the tubular cylinder (1) at a rate of 10 kg/hr. At the same time, salad oil was supplied from a pump (not shown in the drawings) into the inlet (3) of the tubular cylinder (1) at a rate of 0.4 kg/hr. The food material was roasted for about 1 minute and 20 seconds. Table 1 shows the data obtained while opening the vent port (5).

TABLE 1

| Lot No | Brix of feed | Cylinder temp (C.) (Steam) | Brix after roasting (%) | Ratio(%) of concn | Color tone | | |
|---|---|---|---|---|---|---|---|
| | | | | | L | A | B |
| 1 | 9.6 | 110 | 14.7 | 153 | 25.6 | 5.4 | 10.2 |
| 2 | 9.6 | 140 | 15.8 | 153 | 23.1 | 4.6 | 9.5 |
| 3 | 9.6 | 150 | 17.4 | 181 | 16.3 | 4.7 | 6.8 |

EXAMPLE-2

Square onion pieces (3–5 mm) were roasted under the same conditions as those described in Example-1. Table 2 shows the data thus obtained.

TABLE 2

| Lot No | Brix of feed | Cylinder temp (C.) (Steam) | Brix after roasting (%) | Ratio(%) of concn | Color tone | | |
|---|---|---|---|---|---|---|---|
| | | | | | L | A | B |
| 1 | 9.6 | 110 | 15.3 | 159 | 25.3 | 5.2 | 10.7 |
| 2 | 9.6 | 140 | 15.9 | 165 | 23.4 | 4.2 | 9.1 |
| 3 | 9.6 | 150 | 18.1 | 189 | 16.6 | 4.4 | 6.3 |

(Evaluation of Qualities)

Based on these results, it is confirmed that excellent roasted products can be obtained regardless of the size of the food material.

The method and apparatus for continuous roasting of food materials having the describe-above constructions can establish the following effects.

Since the paddle screw (4) is used in roasting and the blades (9f) are attached in such a manner as to contact, at least once, with all faces of the inner wall (6a) of the tubular cylinder (1) while said screw shaft makes one rotation, the food material can be continuously roasted under the same conditions, which ensures the achievement of uniform qualities of the roasted products.

The food material is pooled in a thin layer in the tubular cylinder and mixed up by the blades. Thus, the food material can be homogeneously heated and scarcely loses the shape.

Moreover, the blades (9f) come in contact with the whole inner wall (6a) of the tubular cylinder (1) and thus serve as scrapers. Thus, the food material does not adhere to the inner wall (6a) for a long time but migrates as a whole while changing the contact angle. As a result, roasting can be carried out uniformly without scorching.

Furthermore, it is possible to monitor the food material under roasting and immediately and easily control the heating temperature, the processing speed, additives, etc., thus minimizing the occurrence of defectives.

What is claimed is:

1. A method for continuous roasting of food materials comprising the steps of: mixing up and transferring a food material in a powdery, particulate, chipped or shredded form in a horizontally placed, tubular cylinder with open ends under heating with the use of a paddle screw provided with a plurality of blades; wherein said plurality of blades are attached to a shaft of said paddle screw via an elastic member, and wherein said steps of mixing up and transferring the food material in said tubular cylinder includes scraping an inner wall of said tubular cylinder with said plurality of blades.

2. A method for continuous roasting of food materials as claimed in claim 1, wherein said food material is supplied quantitatively from the inlet of said tubular cylinder and mixed up and transferred therein in such a state as filling not more than a half of the cross-sectional area of the bore through said tubular cylinder.

3. A method for continuous roasting of food materials as claimed in claim 2, wherein said food material is mixed up and transferred with a paddle screw provided with angle adjustable blades.

4. A method for continuous roasting of food materials as claimed in claim 1, wherein said food material is mixed up and transferred with a paddle screw provided with angle adjustable blades.

5. The method for continuous roasting of food materials in accordance with claim 4, wherein said angle adjustable blades are attached to a shaft of said paddle screw via the elastic member, and wherein said steps of mixing up and transferring the food material in said tubular cylinder includes scraping the inner wall of said tubular cylinder with said angle adjustable blades.

6. The method of continuous roasting of food materials as claimed in claim 4, wherein said angle adjustable blades scrape the inner wall of said tubular cylinder.

7. A method for continuous roasting of food materials comprising the steps of:

continuously supplying a food material in a powdery, particulate, chipped or shredded form from an inlet at one end of a horizontally placed, tubular cylinder;

mixing up and transferring said food material in said tubular cylinder with open ends under heating with the use of a paddle screw; and continuously discharging the food material from an outlet at another end of said tubular cylinder;

wherein said paddle screw comprises a plurality of blades which are attached to a shaft of said paddle screw via an elastic member, and wherein said step of mixing up and transferring the food material in said tubular cylinder includes scraping an inner wall of said tubular cylinder with said plurality of blades.

8. A method for continuous roasting of food materials as claimed in claim 7, wherein said food material is supplied quantitatively from the inlet of said tubular cylinder and mixed up and transferred therein in such a state as filling not more than a half of the cross-sectional area of the bore through said tubular cylinder.

9. A method for continuous roasting of food materials as claimed in claim 7, wherein said food material is mixed up and transferred with a paddle screw provided with angle adjustable blades.

10. The method for continuous roasting of food materials in accordance with claim 9, wherein said angle adjustable blades are attached to a shaft of said paddle screw via the elastic member, and wherein said steps of mixing up and transferring the food material in said tubular cylinder includes scraping the inner wall of said tubular cylinder with said angle adjustable blades.

11. The method of continuous roasting of food materials as claimed in claim 9, wherein said angle adjustable blades scrape the inner wall of said tubular cylinder.

* * * * *